United States Patent [19]

Graham

[11] 4,445,048

[45] Apr. 24, 1984

[54] HIGH SPEED RIBBON CABLE BUS

[75] Inventor: Martin H. Graham, Berkeley, Calif.

[73] Assignee: Rolm Corporation, Santa Clara, Calif.

[21] Appl. No.: 488,008

[22] Filed: May 2, 1983

Related U.S. Application Data

[63] Continuation of Ser. No. 137,309, Apr. 4, 1980, abandoned.

[51] Int. Cl.³ .............................................. H04B 3/00

[52] U.S. Cl. ..................................... 307/42; 307/147; 333/124; 328/105; 375/36; 455/88

[58] Field of Search ......................... 307/42, 147, 455; 361/398; 333/24 R, 1, 100, 124; 328/71, 105, 153; 375/36; 455/88; 179/37, 38, 39, 40

[56] References Cited

U.S. PATENT DOCUMENTS 3,179,904 4/1965 Paulsen .................................. 333/1
3,760,200 9/1973 Taniguchi et al. .................. 307/455
3,813,651 5/1974 Yamada .............................. 364/200
4,176,341 11/1979 Miyazaki .............................. 375/36

*Primary Examiner*—G. Z. Rubinson
*Assistant Examiner*—James L. Dwyer
*Attorney, Agent, or Firm*—Blakely, Sokoloff, Taylor & Zafman

[57] ABSTRACT

A high speed bus structure is described which employs an ordinary flat ribbon cable. ECL receivers are coupled to conductor pairs of the cable through resistors which change the capacitive load of the ECL receivers to a resistive load. The receivers are coupled to the cable through a plurality of connectors having spaced-apart pins. The pins in each connector engage less than all of the conductor pairs, thus a plurality of connectors are required to completely couple receivers to all the conductors in the cable. This connector arrangement substantially reduces the parasitic capacitance loading on the cable. The invented high speed bus is able to effectively function at 100 MHz with 80 feet of cable and with 16 receivers coupled to each conductor pair.

11 Claims, 6 Drawing Figures

Fig. 5
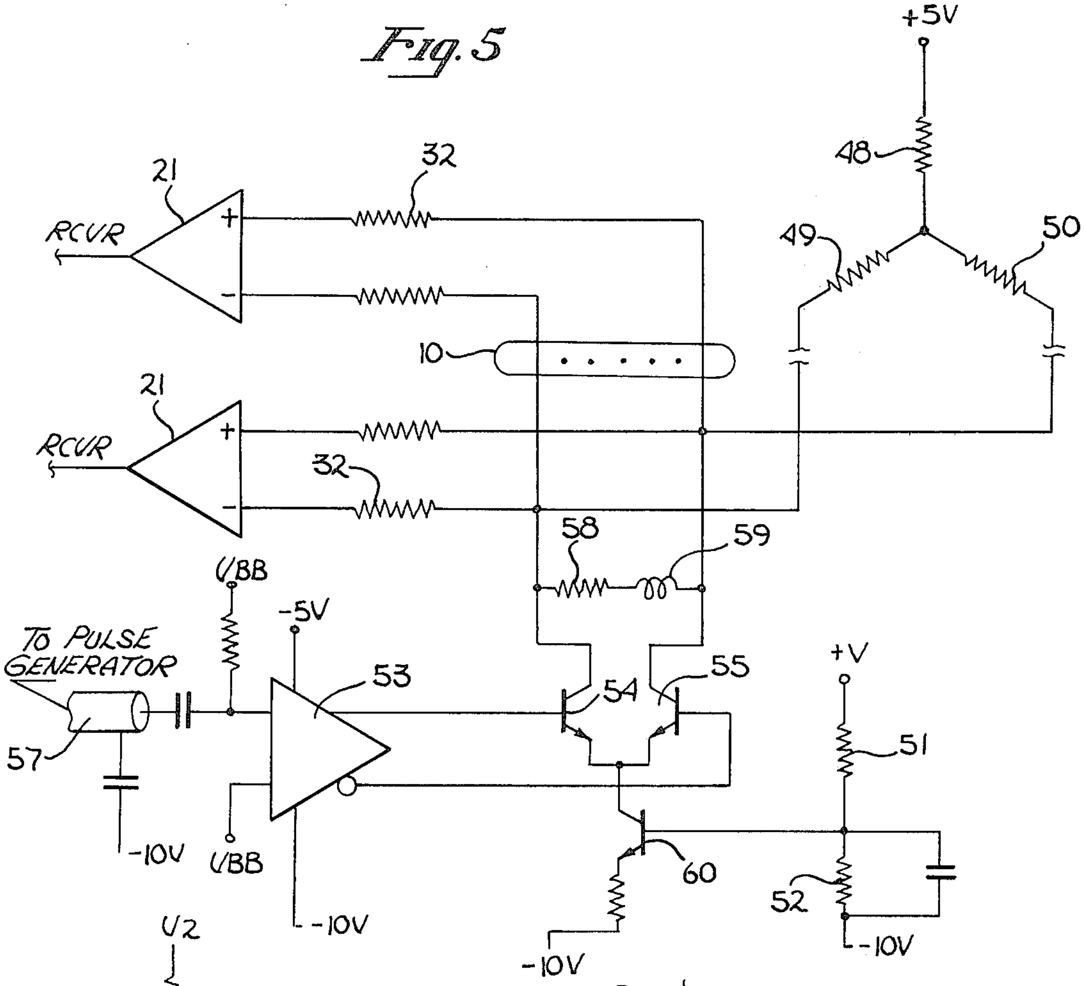
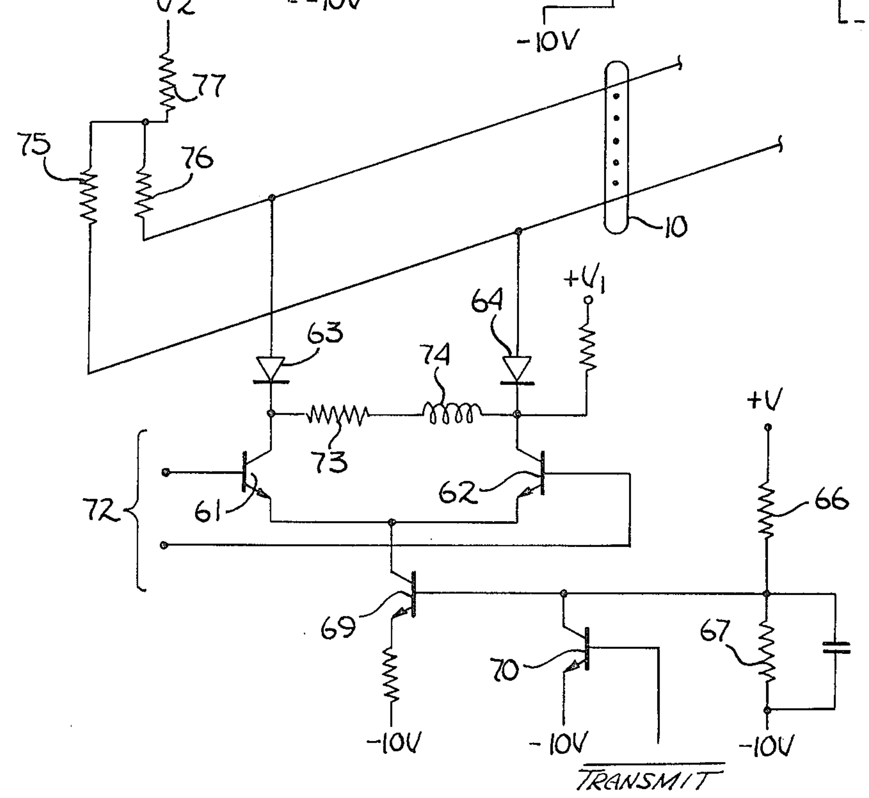
Fig. 6

HIGH SPEED RIBBON CABLE BUS

This application is a continuation, of application Ser. No. 137,309, filed Apr. 4, 1980 abandoned.

BACKGROUND OF THE INVENTION

1. Field of the Invention

The invention relates to the field of high speed buses, particularly those using flat ribbon cable.

2. Prior Art

There is an ever increasing need in the electronics industry for long, high speed buses, particularly for communicating digital information. Current technology provides numerous such buses. However, in many instances, these buses employ relatively expensive cables, such as co-axial cables and expensive bus driving circuitry and receiving circuitry.

Flat ribbon cables are often used for buses. These cables are relatively inexpensive, moreover, there are numerous cable accessories, such as connectors which are readily available. However, the bandwidth of these cables, particularly as they become longer, is limited.

As will be described, the present invention employs ribbon cables in a high speed bus. Through use of a combination of unique geometries, isolation and circuitry, a greatly increased bandwidth is obtained. By way of example, a bandwidth of 100 MHz is obtainable with cable lengths up to 80 feet and with 16 receiving stations on the bus.

The high speed bus of the present invention may be used in countless applications. For example, the bus may interconnect computers housed in separate cabinets, intercabinet connections or intracabinet connections may be made between a memory and a central processing unit, as well as to a host of other equipment.

The present invention resulted from a development program for improving a bus structure in a computerized private branch exchange (PBX). Specifically, the bus was designed for both intershelf connections and intercabinet connections. For this reason, and also to provide more insight into the invented bus, a specific prior art bus structure shall be discussed, along with the improved bus structure in a PBX environment. It will be apparent to one skilled in the art that the invented bus may nonetheless be used in a plurality of other applications.

In one prior art PBX, time division multiplexed signals are transferred along a multi-conductor bus in parallel during each time slot. For this structure, it is assumed that the data is "in phase" along the entire bus. That is, a data bit originating at any station is expected to be propagated to any receiving station within each of the time slots. This restricts the maximum bit rate of the system to a function of the total cable length. As will be seen in the present invention, to eliminate this particular problem, the data is transmitted serially (burst mode transmission). Each time slot then may be shorter than the propagation time along the cable. To prevent bus arbitration problems, each station or unit is allocated its own "private" transmitting line.

In the prior art structure, receiving circuits were separated from the bus (ribbon cable) by relatively long traces on circuit boards. Also, the connector arrangement added to the total effective parallel admittance as seen from the bus, further degrading performance. The present invention provides unique configurations and circuits which substantially improve this aspect of overall bus performance.

SUMMARY OF THE INVENTION

A bus structure which employs a ribbon cable for interconnecting a plurality (n) of electrical units or stations is disclosed. A plurality of driver circuits, one for each of the units, is used for transmitting signals from its respective unit to a pair of conductors within the cable. At least n-1 receivers are associated with each of the units in order that each unit is able to sense the signals transmitted by all of the other units (broadcast transmission mode). Connector means, one for each of the units, are used for coupling the receivers to the pairs of conductors within the ribbon cable. Each of the connector means includes at least a first and a second electrical connector for engaging the cable. Each of the connectors has a plurality of spaced-apart pins which receive the signals from the cable. The pins in the first connector are arranged to receive signals from pairs of the conductors which are separated by other pairs of conductors. The pins in the second connector are arranged to receive signals from the other pairs of conductors. In this manner, the capacitance coupling associated with coupling to the cable is substantially reduced, providing an increased bandwidth.

In the presently preferred embodiment, the bus drives include a pre-emphasis network for emphasizing predetermined frequencies from the transmitters. The transmitters operate in a burst mode, thus permitting transmission without the assumption that all the signals are "in phase". The receivers employ emitter-coupled logic (ECL) circuits which are connected to the cable through series resistors. These receivers are mounted in close proximity (on a printed circuit board) to the connectors engaging the cable. A bandwidth of 100 MHz has been realized with this arrangement with ribbon cable lengths up to 80 feet and with 16 units coupled to the cable.

BRIEF DESCRIPTION OF THE DRAWINGS

FIG. 5 is a circuit diagram of one embodiment of the driver circuit used to drive the conductors in the cable.

FIG. 6 is an alternate embodiment of the driver circuit of FIG. 5.

DETAILED DESCRIPTION OF THE INVENTION

A bus structure is described which employs an ordinary ribbon cable. In the following description numerous specific details, particularly those relating to the use of the bus structure in a computerized PBX, are set forth. However, it will be apparent to one skilled in the art that the invention may be practiced without these specific details and in applications other than for PBXs.

In other instances, well-known circuits have been shown in block diagram form in order not to obscure the present invention in unnecessary detail.

Figure 1:
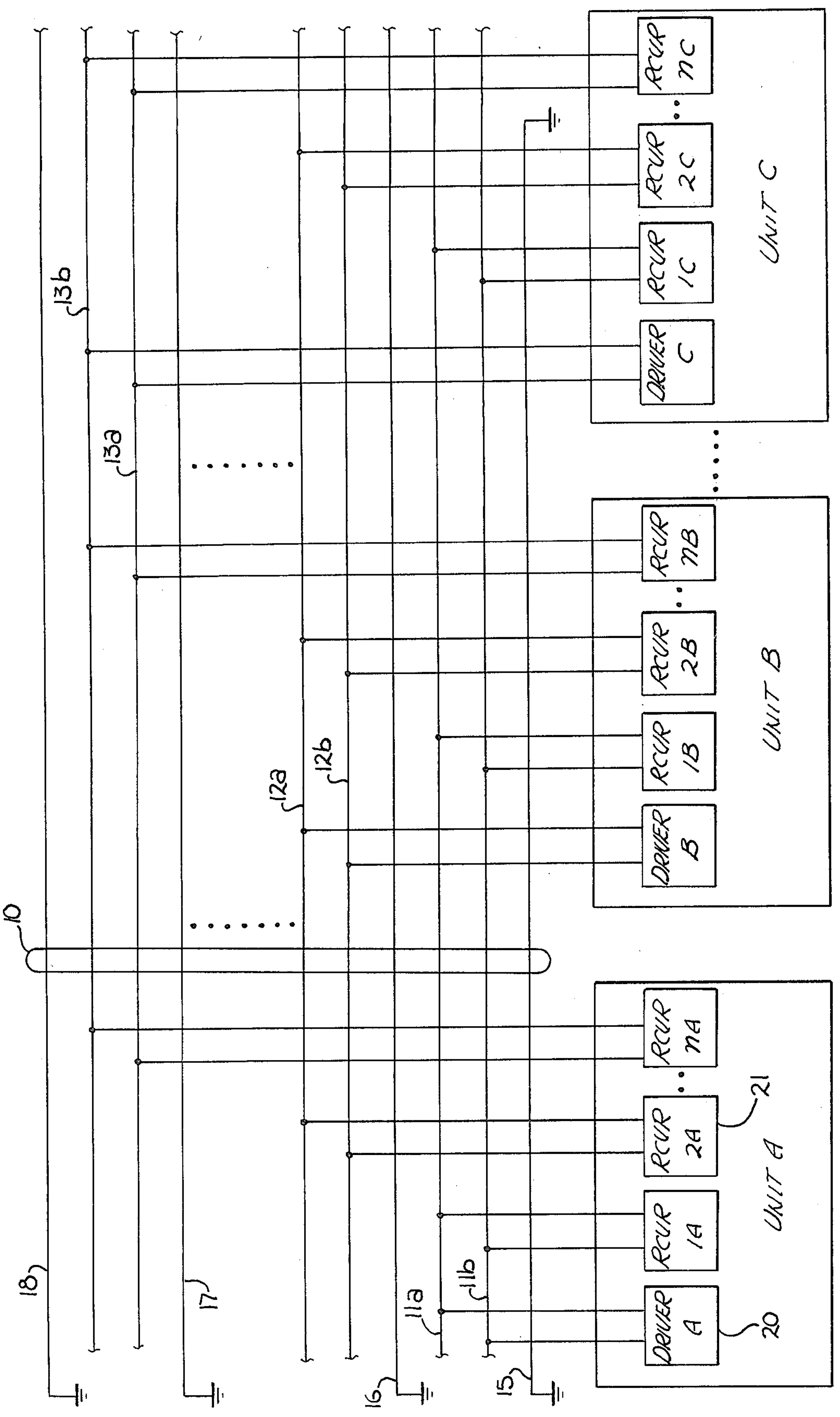
FIG. 1 is a block diagram illustrating the manner in which the electrical units (such as PBXs) are coupled to the ribbon cable in a broadcast mode.

Referring first to FIG. 1, the manner in which a plurality of electrical units, such as computerized PBXs (or other electrical units, such as central processing units, memories, etc.,) are coupled to the flat ribbon cable 10 in a broadcast mode is illustrated. Three units, units A, B, and C are connected to the various conductors in the ribbon cable.

Each unit includes a driver, such as driver 20, which drives a single pair of conductors in the cable. For example, driver A drives leads 11*a* and 11*b*, driver B leads 12*a* and 12*b* and driver C leads 13*a* and 13*b*. Each of the units includes a plurality of receivers for sensing the signals impressed on the cable by the drivers of the various units. (As presently implemented, all the receivers are identical.) For example, referring to unit B, receiver 1B is connected to the leads 11*a* and 11*b*, receiver 2B to the leads 12*a* and 12*b* and receiver nB to the leads 13*a* and 13*b*. Each pair of leads is separated by a lead which is coupled to a constant potential or to ground. These are shown as leads 15, 16, 17 and 18 in FIG. 1. The isolation provided by these leads can also be obtained by providing a space between each pair of active leads, however, this is not so easily realized where a standard cable is used.

In the presently preferred embodiment, in order to provide symmetry of operation, each unit includes a receiver which "listens" to the driver of that unit. By way of example, the receiver nC is coupled to leads 13*a* and 13*b*, and thus receives signals from the driver C. In some applications, it may be feasible to eliminate receiver nC, and like receivers, with an internal connection within the unit.

With the arrangement of FIG. 1, each of the units has its own "private" transmission line and each unit has a receiver coupled to each of the active lines in the cable. This eliminates all bus arbitration problems, since all the units can asynchronously transmit, thereby fully utilizing the capacity of the cable.

In the presently preferred embodiment, the ribbon cable is a flat (co-planar) cable with 50 conductors. This permits 16 units to be interconnected by active conductor pairs with the described isolation between each pair.

Figure 2:
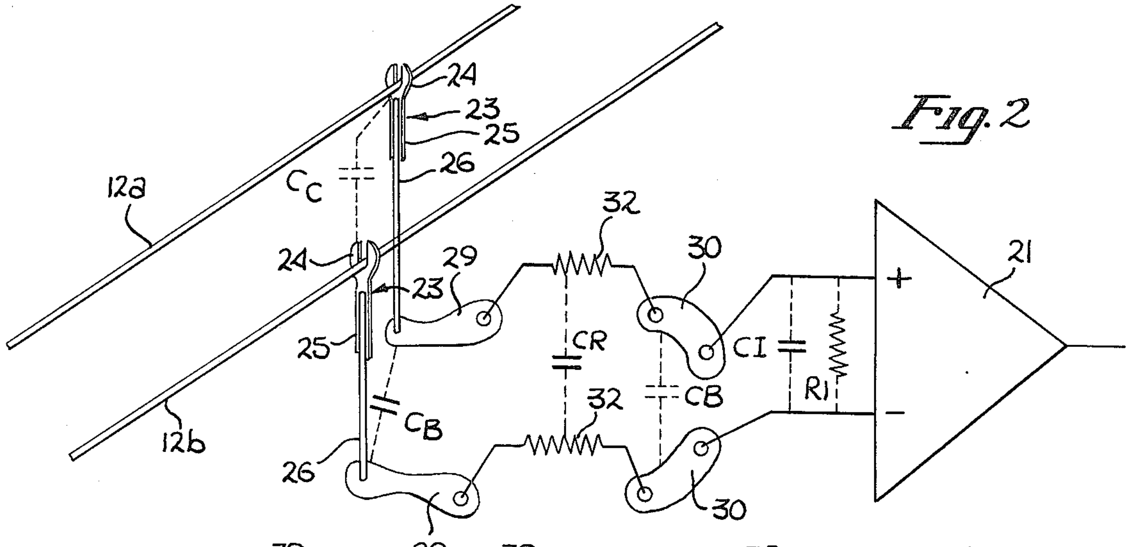
FIG. 2 is a circuit diagram which illustrates the interconnection between a receiver and conductors of the ribbon cable.

Referring to FIG. 2, in the presently preferred embodiment, each of the receivers 21 is a commercially available emitter-coupled logic (ECL) circuit. The input to these circuits are coupled to the conductor pairs of the cable (such as conductors 12*a* and 12*b*) through series resistors 32. The pin assemblies 23 are shown press fit to the conductors and engaging circuit board traces 29. One end of these traces engage the female pin members 26, while the other end of these traces are connected to one end of the resistors 32. The traces 30 interconnect the other ends of the resistors to the input terminals of the circuit 21.

The advantages gained from use of the series resistors 32 and the spacing technique used for the pin assemblies of the connectors (described below) can best be illustrated by way of example. Typically, the input resistance $R_I$ for an ECL circuit is approximately 6k ohms. The input capacitance $C_I$ is approximately 5 pF. At 100 MHz, $C_I$ obviously dominates. In the presently preferred embodiment, wide pin spacing (as will be described below) is provided in the connectors by removing pin assemblies from a standard flat cable connector, such as the 3 M Part No. 3307-000. With this removal, $C_C$ can be reduced to 0.2 pF. The capacitance associated with the traces 29 and 30 ($C_B$) is approximately 0.5 pF. $C_R$, the capacitance associated with the resistors 32 is approximately 0.4 pF.

Assume first that the series resistors 32 are not employed. (This is the typical prior art structure.) In this case, $C_R$ is eliminated, however, there is an increased trace capacitance, making $C_B$ equal to approximately 0.6 pF. Without the resistors, the total parasitic capacitance loading on the conductors is approximately 5.8 pF or a reactive component of approximately 300 ohms at 100 MHz. This produces intolerable reflections into the 160 ohm cable at these frequencies.

In the presently preferred embodiment, the resistors 32 are each 330 ohms. The use of these resistors does increase the effective input impedance of the receiver and to some extent, it slows the response time of the receivers. However, this resistance has the advantage of changing the impedance of the receiver, as seen from the cable, from highly capacitive to mostly resistive. This greatly decreases the distortion of pulses (for digital transmission) received by receiver 21 and improves system rise time. The increased cable propagation obtained through use of these resistors greatly outweighs the slight degradation of receiver performance. The value of the resistors 32 is not particularly critical; the selected values of 330 ohms for the present embodiment was obtained by simply weighing the improved cable performance against the loss of receiver (input) performance. An optimized value may be readily selected by examining the various capacitances and resistances as described in conjunction with FIG. 2.

The capacitances $C_C$ and $C_B$ for the prior art bus structure are not of great significance (when compared to $C_I$); however, these capacitances assume a major role because of the series resistors 32. For this reason, much greater care must be taken to reduce these capacitances as shall be described.

In a typical ribbon cable connector, the female part of the connector includes a plurality of pressure contacts 24 as shown in FIG. 2. Typically, these contacts are pressure fit onto the cable and include cylindrical openings 25 which receive pins 26 from the male part of the connector. To reduce the capacitance coupling ($C_C$) some of the contact assemblies 23 are removed from the male and female parts of the connectors.

Figure 3:
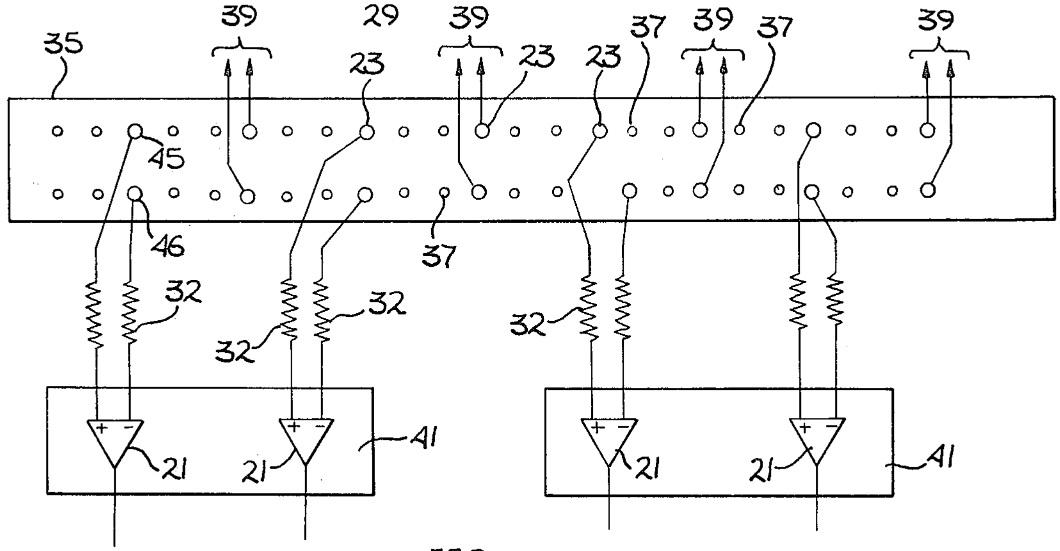
FIG. 3 is a plan view of a connector which illustrates the coupling between a connector engaging the ribbon cable and receivers mounted on a printed circuit board.

Referring to the connector 35 shown in plan view in FIG. 3 only every third contact assembly remains within the connector 35. The larger circles in FIG. 3 denote the remaining pins 23, which are separated from one another by two apertures 37. In practice, the contact assemblies are simply removed from both the male and female parts of the connectors, leaving the apertures 37. Thus, to make contact to each of the conductors in a cable (for the described embodiment) three connectors are required instead of the usual single connector.

For the above described 3 M connector, leaving only every third pin assembly increases the spacing between the contact members in the connectors from approximately 0.1 inches to approximately 0.3 inches. The same result, of course, can be achieved by fabricating connectors having a wider pin spacing, however, it has been found much more economical to use currently available commercial connectors and to remove the desired pins.

Figure 4:
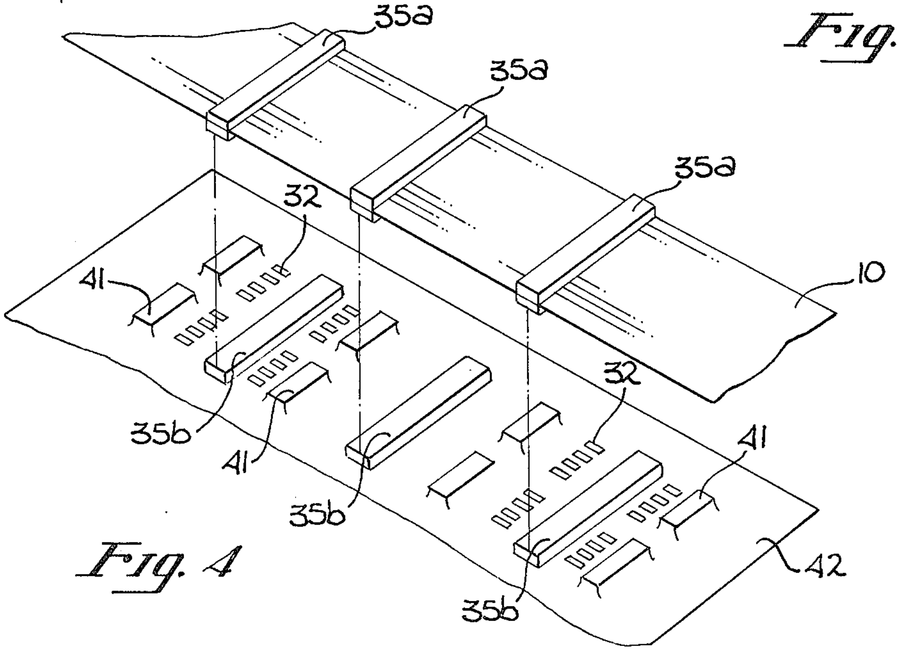
FIG. 4 is a perspective view illustrating the layout for connectors on the cable, corresponding mating connectors on a printed circuit board, receivers and series resistors.

Referring to FIG. 4, the male part 35*a* of connectors is shown coupled to the cable while the female part 35*b* is mounted on a printed circuit board 42. For the described embodiment, the two outer connectors are used for coupling the conductor pairs to the receivers while the center connector is used for grounding the conductors which separate each of the conductor pairs.

As shown best in FIG. 3, one contact from one side of each outer connector of FIG. 4 and another contact from the other side of the connector (such as contacts 45 and 46) are coupled to a receiver mounted along one side of the connector. The next pair of contacts provide coupling to a receiver mounted on the other side of the connector. (In FIG. 3, only those receivers mounted on one side of the connector are shown, however, the leads 39 provide the coupling to the receivers mounted on the other side of the connector).

The layout of the receivers and connectors are best illustrated in FIG. 4. Two ECL circuits are included on each package 41. Two such packages are mounted on each side of the outer connectors. The resistors 32 are mounted between the male part 35*b* of the connectors and the packages 41. As illustrated, the ECL circuits and resistors are mounted in close proximity on the printed circuit board 42 to the connector part 35*b* and are interconnected through the traces 29 and 30 shown in FIG. 2.

With this connector arrangement, each connector engages conductors, which are separated by other conductors to which no contact is made. For the illustrated embodiment, for the two outer connectors, a conductor pair and grounded conductor lies between every contacted conductor pair. In the case of the center connector, which provides the ground connections, two pairs of conductors separate each of the contacted conductors.

The substantial reduction in the parasitic capacitance $C_C$ obtained with this connector arrangement and the reduction of $C_B$ obtained by mounting the ECL circuits and resistors in close proximity to the connectors, makes possible the advantageous use of the resistors 32 of FIG. 2.

In FIG. 5, an embodiment for a driver circuit, such as the drivers 20 of FIG. 1, is illustrated. Two receivers 21 are shown coupled to a conductor pair of the ribbon cable 10. These conductors (at the end of the cable) are coupled to a positive potential through the resistors 48, 49 and 50 which act as loads. The conductor pair is driven in a push-pull mode through the npn driver transistors 54 and 55. The bases of these transistors are coupled to an amplifier 53 which provides the differential outputs needed to drive the transistors 54 and 55. The amplifier 53 is driven by a pulse-generator 57 which of course receives the digital data or other data to be transmitted from an electrical unit such as a PBX. The transistor 60 provides a constant current source since its base is biased at a constant potential through the resistors 51 and 52.

Importantly, this driver circuit provides high frequency pre-emphasis (at approximately 100 MHz for the described embodiment). The resistor 58 and inductor 59 which are coupled across the conductor pair (along with the distributed parasitic capacitance and distributed resistance associated with the cable) provides this pre-emphasis. This pre-emphasis increases the high frequency performance of the cable since it compensates for the high frequency "roll-off" of the cable and receiver circuits.

The circuit of FIG. 5 operates best when only a single transmitter is used on each of the conductor pairs. Thus, this circuit may be used for the configuration of FIG. 1. In some applications, it is desirable to have more than a single transmitter or driver on each of the conductor pairs. This requires those drivers not in use to be turned-off. At first it may appear that by simply disconnecting the constant current source associated with transistor 60, the driver circuit will be effectively disconnected from the conductor pair. However, the reverse bias, collector-to-base capacitance of transistors 54 and 55 and the parasitic capacitance associated with the driver circuit layout will continue to load the line.

In FIG. 6, a driver circuit is shown which substantially decouples itself from the line when not transmitting. This permits a plurality of drivers to be coupled to a single conductor pair. Again, in FIG. 6, a pair of npn driver transistors 61 and 62 are driven through their base terminals via lines 72 with a differential signal. The collectors of these transistors are coupled to the conductor pair through diodes 63 and 64. These conductors (at the end of the cable) are connected to a positive potential $V_2$ through resistors 75, 76, and 77 which act as loads for the transistors. The emitters of the transistors 61 and 62 are again coupled to a constant current source. This constant current source is provided through transistor 69 which has its base biased at a constant potential through resistors 66 and 67. The circuit also provides pre-emphasis through the resistor 73 and inductors 74 as described in conjunction with FIG. 5.

When the driver circuit of FIG. 6 is not in operation, the transistor 70 conducts since a transmit signal is applied to its base. When this occurs, the constant current to the driver transistors 61 and 62 is removed. This draws the cathodes of diodes 63 and 64 to a positive potential $V_1$ through resistor 68 (and resistor 73 in the case of diode 63) reverse biasing the diodes. Note $V_1$ must be larger than $V_2$ to assure reverse biasing of the diodes. Then the conductor pair is isolated from transistors 61 and 62 by the capacitance associated with these reverse biased diodes. Thus, the driver circuit is substantially decoupled from the cable when not transmitting. Note that during transmission, neither diode 63 nor 64 are reverse biased so that the switching time of these diodes are not critical.

Thus, a bus structure has been disclosed which permits the use of an ordinary, inexpensive, ribbon cable in a high speed application. A bandwidth of 100 MHz has been obtained with approximately 80 feet of cable and up to 16 receivers coupled to each active conductor pair in the cable.

I claim:

1. A high speed bus for interconnecting and asynchronously transmitting data between a plurality (n) of electrical units, comprising:
- a ribbon cable having a plurality of conductor pairs;
- a plurality of driver circuits for transmitting signals serially, each of said driver circuits coupled to one of said electrical units and coupled to a different conductor pair of said cable;
- a plurality of receivers coupled to each of said electrical units for receiving said signals, each of said electrical units having at least n-1 receivers, each receiver being coupled to a different conductor pair of said cable;
- at least one resistor coupled in series between each of said receivers and said conductor pairs for reducing the capacitive coupling between said cable between said cable and said receivers;

a plurality of low capacitance connector means, one for each of said units for providing said coupling to said conductor pairs for said receivers, each of said connector means comprising:

at least a first and a second electrical connector for engaging said cable, each electrical connector having a plurality of spaced apart pins for receiving signals from said cable, said pins of said first connector arranged to receive signals from a first conductor pair, said pins of said second connector arranged to receive signals from a second conductor pair separated from said first conductor pair;

whereby the capacitive coupling of said receivers to said cable is reduced, and said electrical units may simultaneously and asynchronously transmit and receive data on said cable at high speed.

2. The bus as defined by claim 1 wherein data is transmitted between 30 and 100 Mhz.

3. The bus as defined by claim 1 wherein each of said driver circuits comprises:

a transistor;

a diode coupled between said transistor and said conductor;

a load for said transistor coupled to said condutor;

current means coupled to said transistor for selectively providing current for said transistor;

biasing means coupled to said diode, for reverse biasing said diode when said current means is not providing said current for said transistor;

whereby said transistor is decoupled from said conductor by said diode when said current means is not enabled.

4. The circuit defined by claim 1 wherein said diode is coupled between the collector of said transistor and said conductor.

5. The bus structure defined by claim 3 wherein each of said connectors includes a male part and a female part, one of said parts being coupled to said cable, the other of said parts being coupled to a board.

6. The bus structure defined by claim 5 wherein each of said pair of conductors in said cables is separated by another of said conductors which is coupled to a constant potential.

7. The bus structure defined by claim 6 wherein said constant potential is ground potential.

8. The bus structure defined by claim 7 wherein each of said drivers includes a pre-emphasis means for preemphasizing predetermined frequencies.

9. The bus structure defined by claim 8 wherein each of said drivers, drives said pairs of conductors in a push-pull mode.

10. The circuit defined by claim 3 wherein said current means is a constant current source coupled to the emitter of said transistor.

11. The bus structure defined by claim 10 wherein a pair of said driver circuits are coupled to a pair of said conductors and wherein said transistors are driven with a differential signal.

* * * * *